United States Patent
Huang et al.

[11] Patent Number: 5,905,972
[45] Date of Patent: May 18, 1999

[54] PROSODIC DATABASES HOLDING FUNDAMENTAL FREQUENCY TEMPLATES FOR USE IN SPEECH SYNTHESIS

[75] Inventors: Xuedong D. Huang, Redmond; James L. Adcock; John A. Goldsmith, both of Bellevue, all of Wash.

[73] Assignee: Microsoft Corporation, Redmond, Wash.

[21] Appl. No.: 08/724,071

[22] Filed: Sep. 30, 1996

[51] Int. Cl.$^6$ ........................................ G10L 9/00
[52] U.S. Cl. ........................ 704/268; 704/258; 704/278
[58] Field of Search ................................. 704/268, 258, 704/278, 4, 6, 10, 7

[56] References Cited

U.S. PATENT DOCUMENTS

| | | | |
|---|---|---|---|
| 4,139,732 | 1/1978 | Fourcin | 704/270 |
| 4,489,433 | 3/1984 | Suehiro | 381/41 |
| 4,797,930 | 11/1983 | Goudie | 381/52 |
| 4,862,504 | 1/1987 | Nomura | 381/51 |
| 5,384,893 | 9/1992 | Hutchins | 704/268 |
| 5,592,568 | 2/1995 | Wilcox | 381/218 |
| 5,636,325 | 1/1994 | Farrett | 704/258 |

OTHER PUBLICATIONS

Breckenridge Pierrehumbert, Janet, "The Phonology and Phonetics of English Intonation," Submitted in Partial Fulfillment of the Requirements for the Degree of Doctor of Philosophy, Massachusetts Institute of Technology, Sep. 1980, pp. 1–400.

Goldsmith, John A., "Autosegmental Phonology," Submitted in Partial Fullfillment of the Requirements for the Degree of Doctor of Philosophy, Massachusetts Institute of Technology, Jun. 1976, pp. 1–280.

Ross, Kenneth N., Modeling of Intonation for Speech Synthesis, Submitted in Partial Fulfillment of the Requirements for the Degree of Doctor of Philosophy, Boston University College of Engineering, 1995, pp. 1–243.

*Primary Examiner*—David R. Hudspeth
*Assistant Examiner*—Daniel Abebe

[57] ABSTRACT

Prosodic databases hold fundamental frequency templates for use in a speech synthesis system. Prosodic database templates may hold fundamental frequency values for syllables in a given sentence. These fundamental frequency values may be applied in synthesizing a sentence of speech. The templates are indexed by tonal pattern markings. A predicted tonal marking pattern is generated for each sentence of text that is to be synthesized, and this predicted pattern of tonal markings is used to locate a best-matching template. The templates are derived by calculating fundamental frequencies on a pursuable basis for sentences that are spoken by a human trainer for a given unlabeled corpus.

38 Claims, 6 Drawing Sheets

TIME

TIME

PROSODIC DATABASES HOLDING FUNDAMENTAL FREQUENCY TEMPLATES FOR USE IN SPEECH SYNTHESIS

TECHNICAL FIELD

The present invention relates generally to data processing systems and, more particularly, to prosodic databases that hold fundamental frequency templates for use in speech synthesis.

BACKGROUND OF THE INVENTION

Text-to-speech systems synthesize speech specified by textual input. One of the limitations of conventional text-to-speech systems has been that they produce very unnatural robotic-sounding synthesized speech. Such synthesized speech does not exhibit the prosodic characteristics typically found with human speech. Most conventional text-to-speech systems generate prosody by applying a small set of rules that define the evolution of prosody parameters with time. Prosody is generally viewed to encompass the duration of sounds, the loudness of sounds and the pitch accent associated with sounds. Certain text-to-speech systems have attempted to employ stochastic techniques to enhance the naturalness of the resulting synthesized speech that is produced by the systems. These stochastic learning techniques have attempted to determine prosody based on statistics that are derived from a corpus of spoken phrases or sentences. These stochastic techniques, however, have also failed to consistently produce natural sounding speech.

SUMMARY OF THE INVENTION

In accordance with a first aspect of the present invention, a computer-implemented method is practiced in system for synthesizing speech. In accordance with this method, text for which speech is to be synthesized is provided, along with prosodic templates. Each prosodic template holds a sequence of fundamental frequency values for units of speech. One of the templates is selected for use in establishing prosody for the synthesized speech for the text. Speech is then synthesized for the text using at least one of the fundamental frequencies from the selected template in establishing prosody for the speech.

In accordance with another aspect of the present invention, a prosodic database of fundamental frequencies for units of speech is provided. Each entry in the prosodic database is indexed by a pattern of tonal markings that correspond with a degree of emphasis for the units of speech for which fundamental frequencies are held. A natural language parse is performed on a given text. Based on the results of the natural language parse, a predicted pattern of tonal markings is predicted for the units of speech in the text. A best-matching index in the prosodic database is identified by comparing the predicted pattern of tonal markings for the units of speech in the text with the indices of the entries in the prosodic database. At least one of the fundamental frequency values in the entry in the prosodic database that is indexed by the best-matching index is used to establish prosody in the synthesized speech for the text.

In accordance with a further aspect of the present invention, a method of building a prosodic database is practiced on a computer system. An acoustical signal is obtained for each of multiple corresponding portions of spoken text that are spoken by a human trainer. Each acoustical signal is the signal that results when the human trainer speaks the corresponding portion of the text. A laryngograph signal for each portion of spoken text is obtained from a laryngograph worn by the human trainer when the portions of text are spoken. The acoustical signals are segmented into segments that represent syllables of the text. Each syllable includes a vowel section. The laryngograph signal is segmented into segments that match the segments of the acoustical signal. A weighted sum of the instantaneous fundamental frequencies for the vowel section of each syllable at each portion of the text is calculated. The fundamental frequencies are obtained from the laryngograph signal and the weights are obtained from the acoustical signal. For each portion of text, the weighted sum of the instantaneous fundamental frequencies for each syllable of the portion of text in the prosodic database is stored and these weighted sums are used to establish prosody of the synthesized speech.

In accordance with an additional aspect of the present invention, a text to speech system includes a parser for parsing input text into units of speech. The system also includes a prosodic database that holds prosodic templates wherein each prosodic template holds a sequence of fundamental frequency values for units of speech. The system further includes a speech synthesizer for generating speech corresponding to the input text by using a selected one of the templates in the prosodic database to obtain fundamental frequency values for units of speech in the input text.

In accordance with a further aspect of the present invention, a prosodic database is provided that holds prosodic templates for different styles of speech. It is determined what prosodic style is to be applied to a portion of speech that is to be generated, and at least one of the templates in the prosodic database for the determined prosodic style is used to generate the portion of speech with the determined prosodic style.

In accordance with yet another aspect of the present invention a prosodic database is provided that holds prosodic templates of different prosodic styles for a single speaker. It is determined which of the prosodic styles is to be applied to a portion of speech that is to be generated by the system and at least one of the templates in the prosodic database is used for the determined prosodic style to generate the portion of speech with the determined prosodic style.

BRIEF DESCRIPTION OF THE DRAWINGS

An exemplary embodiment of the present invention will be described below relative to the following figures.

DETAILED DESCRIPTION OF THE INVENTION

The exemplary embodiment of the present invention provides one or more prosodic databases that hold templates of fundamental frequencies for phrases or sentences. Prosodic databases for multiple speakers may be maintained and multiple prosodic databases for different prosodic styles may be maintained. Each of these databases serves as a kind of "voice font." The prosodic databases are utilized to produce more natural sounding synthesized speech. In synthesizing speech, one can choose from among these voice fonts to set the desired prosody. Specifically, a best-matching template from one of the prosodic databases is used to determine the fundamental frequencies that should be assigned to syllables in synthesized speech output. The text input to the text-to-speech system of the exemplary embodiment of the present invention is processed to determine the best-matching template in the prosodic database. If an exact match is not found, interpolative techniques may be applied to produce a match on unmarked regions from the best-matching template. The resulting synthesized speech is more natural sounding than the speech produced by conventional text-to-speech systems.

Each prosodic database is built by having a human speaker speak sentences from an unlabeled corpus. These sentences are then processed by a natural language processing engine and segmented into phonemes and syllables using hidden Markov model (HMM) techniques. Laryngograph output is generated for each of the spoken sentences. This laryngograph output is segmented in accordance with the segmentation produced on the microphone speech signal by the HMMs. The segmented laryngograph output is processed to determine the weighted fundamental frequency in the vowel portion of each syllable. These weighted fundamental frequencies are stored in entries in the prosodic database and the entries in the prosodic database are indexed by tonal markings.

The exemplary embodiment of the present invention provides a quick and easy approach to determining prosody for a given speaker. The approach is generalized to be ubiquitously applied to all types of text. The exemplary embodiment also provides a mechanism that is easy to train and that produces speech that sounds greatly like the original speaker who trained the system.

Figure 1:
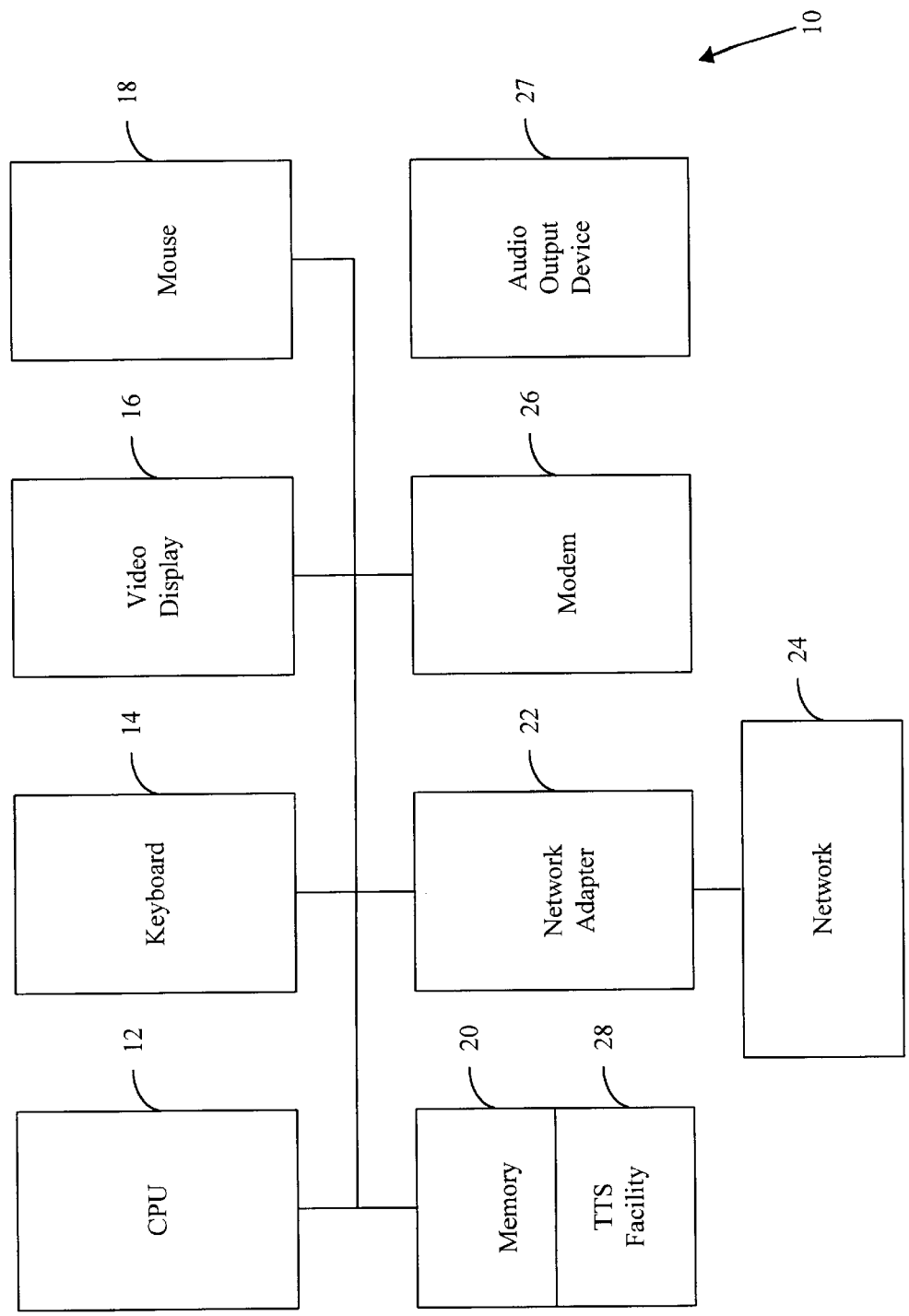
FIG. 1 is a block diagram of a computer system that is suitable for practicing the exemplary embodiment of the present invention.

FIG. 1 depicts a computer system 10 that is suitable for practicing the exemplary embodiment to the present invention. Those skilled in the art will appreciate that the computer system configuration depicted in FIG. 1 is intended to be merely illustrative and not limiting of the present invention. The present invention may also be practiced with other computer system configurations, including distributed systems and tightly coupled multiprocessor systems.

The computer system 10 includes a central processing unit (CPU) 12 and a number of input/output devices. These devices may, for example, include a keyboard 14, a video display 16, and a mouse 18. The CPU 12 has access to a memory 20. The memory 20 holds a copy of a text-to-speech (TTS) facility 28. The TTS facility 28 holds the instructions for practicing the exemplary embodiment to the present invention. The computer system 10 may also include a network adapter 22 for connecting the CPU 12 with the network 24. The computer system 10 may additionally include a modem 26 and an audio output device 27 (such as a loudspeaker) for generating audio output.

The TTS facility 28 includes one or more prosodic databases. Multiple databases for a single speaker may be maintained. For example, a speaker might generate a separate database for different regional accents wherein each accent has its own prosodic style. Further, the speaker might generate a database by reading a newscast and generate another database by reading a children's book. Moreover, separate prosodic databases may be maintained for multiple speakers. As was mentioned above, each of these databases may be considered a separate "voice font."

Figure 2:
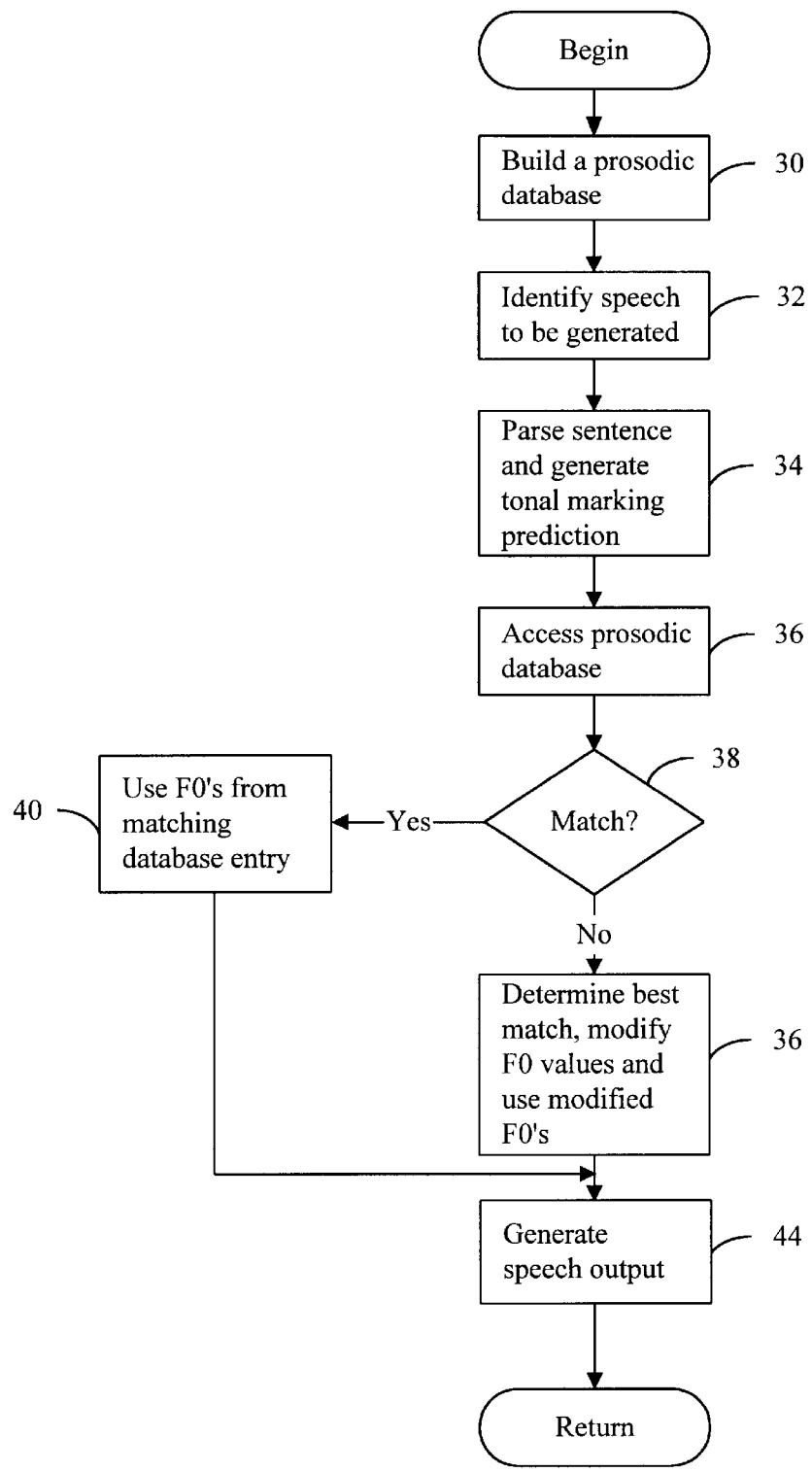
FIG. 2 is a flowchart that illustrates an overview of the steps that are performed by the exemplary embodiment of the present invention to synthesize speech for a given input text sentence.

FIG. 2 is a flowchart that provides an overview of the steps performed by the exemplary embodiment of the present invention to generate synthesized speech output for a single sentence of input text. If multiple input text sentences are to be processed, many of the steps depicted in FIG. 2 (i.e., steps 32–44) may be repeated for each sentence. The flowchart of FIG. 2 will be described in conjunction with the diagram in FIG. 3 which illustrates the basic organization of the TTS facility 28 of the exemplary embodiment of the present invention. The first step that is performed in the exemplary embodiment of the present invention is to build a prosodic database (step 30 in FIG. 2). The prosodic database is part of the prosody templates 60 depicted in FIG. 3. The templates 60 may include multiple prosodic databases or voice fonts. As was discussed above, each prosodic database is generated by having a human speaker speak a number of sentences from an unlabeled corpus and gathering the resulting analog speech signal and laryngograph output. This data is then processed to build the prosodic database.

Figure 4:
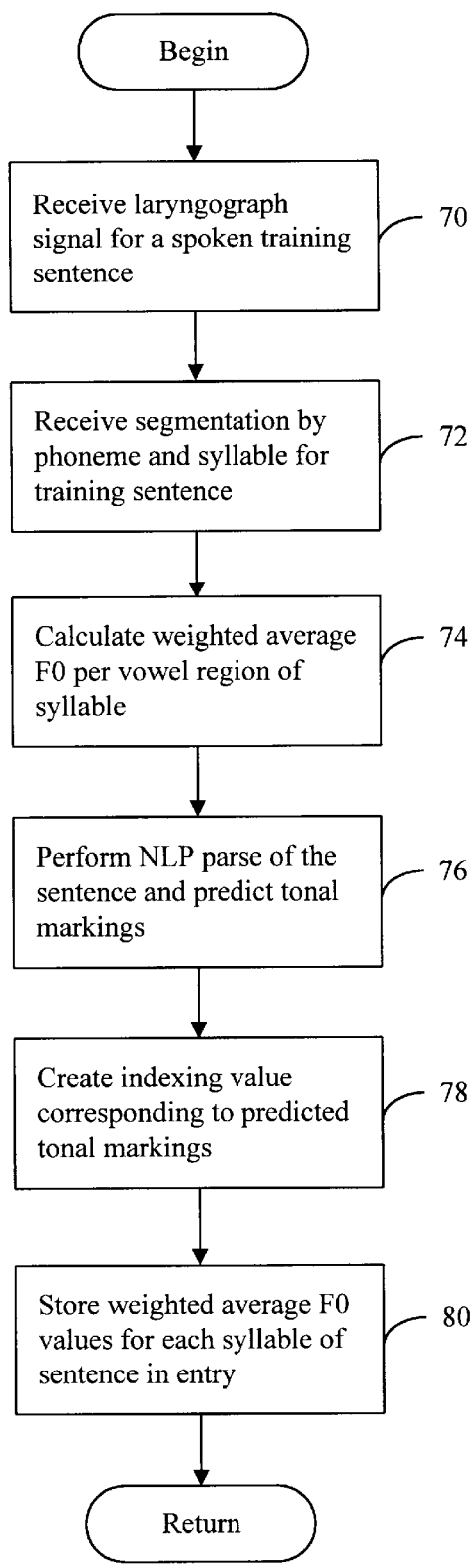
FIG. 4 is a flowchart illustrating the steps that are performed to build an entry in the prosodic database.

FIG. 4 is a flowchart that illustrates the steps that are performed to build the prosodic database in more detail. The steps shown in FIG. 4 are performed for each sentence in the unlabeled corpus 50 that is spoken by the speaker. First, the laryngograph signal for a spoken training sentence is received (step 70 in FIG. 4).

Figure 5A:
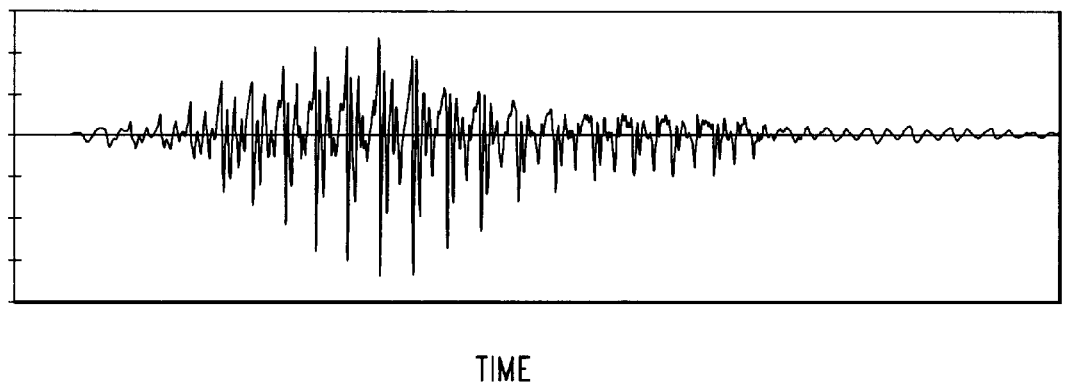
FIG. 5A shows an illustrative acoustical signal.
Figure 5B:
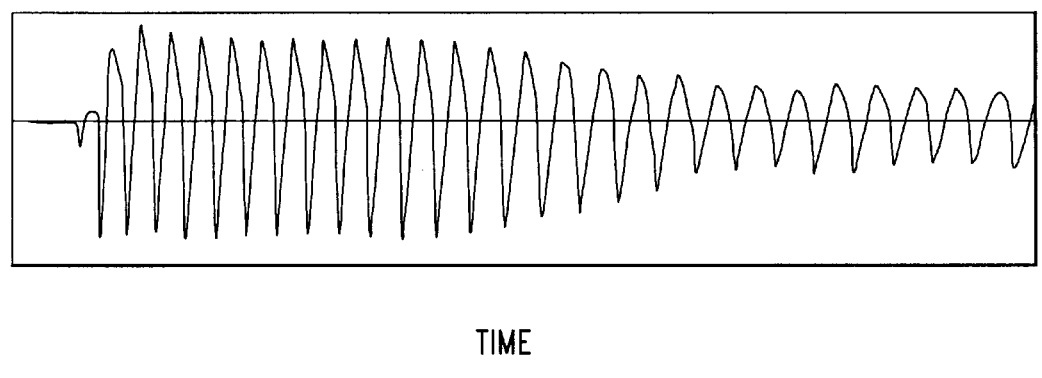
FIG. 5B shows an illustrative laryngographs signal that corresponds with the acoustical signal of FIG. 5A.

FIG. 5A depicts an example of a microphone speech signal. FIG. 5B depicts a corresponding laryngograph signal. This signal provides an indication of how opened or closed a speaker's vocal chords are at a point in time. The segmentation by phoneme and syllable for the training sentence is received to segment the laryngograph signal in a like fashion (step 72 in FIG. 4). Specifically, the laryngograph signal is segmented just like the microphone signal into like-sized segments of time. In particular, HMM training 52 is performed on the spoken sentences of the unlabeled corpus 50 to yield the segmented corpus 54. HMM techniques are well known in the art. A suitable HMM training technique is described in copending application Ser. No. 08/655,273, entitled "Method and System for Speech Recognition Using Continuous Density Hidden Markov Models," which was filed on May 1, 1996, and which is assigned to a common assignee with the present application. These HMM techniques result in a speech signal that is segmented by phoneme and syllable. It is the syllable segmentation that is of special interest to the exemplary embodiment to the present invention.

The laryngograph is processed to identify epoch information and to generate instantaneous fundamental frequency (F0) information. An epoch, in this context, refers to the duration of time in which vocal chords are opened and closed. In other words, one epoch corresponds with one opening and closing of the vocal chords. The fundamental frequency refers to the fundamental frequency at which a speaker's vocal cords vibrate for a syllable. This is the prosodic parameter that is of most interest to the exemplary embodiment to the present invention. The epoch information is derived from the local maximum of a smooth estimate of the duration of the laryngograph signal.

The vowel region is chosen for analysis because typically it is the portion of a syllable that is most greatly emphasized. The weighted F0 is calculated as the weighted sum of the instantaneous fundamental frequency values derived from the laryngograph signal for the vowel portion of a syllable. More formally, the weighted fundamental frequency may be expressed mathematically as:

$$\text{weighted } F0 = \sum_{i=1}^{n} W_i F0_i \bigg/ \sum_{i=1}^{n} W_i$$

where $W_i$=weight; and $F0_i$=fundamental frequency at time i. The fundamental frequency $F0_i$ is calculated as 1 divided by the time that separates adjacent peaks in the laryngograph's signal. Typically, the vowel portion of a syllable will include multiple peaks. The weight W is derived from the acoustical signal and may be formally expressed as:

$$w = \sum_{t=t_a}^{t_b} A(t)^2$$

where A(t)=amplitude of acoustical signal at time t; $t_a$=time at a first peak; and $t_b$=time at second peak. The values of $t_a$ and $t_b$ are those that represent the point in time corresponding to the peak of the laryngograph signal for the first and second peaks, respectively. This weighting scheme causes larger magnitude portions of speech signal to be given greater weight in calculating the perceptual weighted F0 per syllable. The weighting scheme gives more weight to the perceptually important parts of the F0 curve (i.e., places where the amplitude is high).

Natural language processing (NLP) is performed on the sentence (i.e., text analysis 56 is performed) and information derived from the natural language processing is used to predict tonal markings (step 76 in FIG. 4). Any of a number of well-known techniques may be used to perform this parse. The natural language processing parses the sentence, results in identification of parts of speech, context words, grammatical structure of the sentence, type of the sentence and pronunciation of words in the sentence. The information obtained from such an NLP parse is used to predict tonal markings for each syllable of the sentence. It has been recognized that much of human prosodic patterns of speech can be captured by predicting one of three tonal markings for each syllable. These three tonal markings are a high tone, a low tone or no special emphasis. The exemplary embodiment of the present invention predicts the pattern of tonal markings for the parsed input sentence on a per syllable basis. Suitable approaches for predicting and assigning the tonal markings are described in John Goldsmith, "English as a Tone Language," *Communication and Cognition*, 1978, and Janet Pierrehumbert, "The Phonology and Phonetics of English Intonation," *Ph.D. Thesis*, Massachusetts Institute of Technology, 1980. An example of a predicted tonal marking string is "2 H 0 H 0 N 0 L 1-". The string is composed of digits and symbols selected from the set H, L, h, l, + and -. The symbols indicate the tonal properties of certain high salience syllables, primarily accented and final syllables; while the digits indicate how many syllables occur between these accented or final syllables. H and L indicate High and Low tone, respectively, on accented syllables; + and - indicate High and Low tone, respectively, on final syllables; while h and l indicate High and Low tone on the leftmost syllable following the accented syllable (or on the accented syllable itself, if there is no following syllable).

An entry is created in a prosodic database to hold the sequence of weighted fundamental frequencies for the syllables of the sentence. Each entry is indexed by the associated tonal marking string for the sentence (step 78 in FIG. 4). The fundamental frequency values may be stored in the prosodic database as unsigned character values (step 80 in FIG. 4). The above-described steps are performed for each sentence to build the prosodic database. In general, the segmentation and textual analysis are used by the prosody model that is adopted by the exemplary embodiment of the present invention to build the prosody templates 60.

After a prosodic database has been built (see step 30 in FIG. 2), the database may be utilized in speech synthesis. The first step in the speech synthesis is to identify the speech that is to be generated (step 32 in FIG. 2). In the exemplary embodiment of the present invention, this speech is a chunk of text that represents a sentence. Nevertheless, those skilled in the art will appreciate that the present invention may also be practiced with other granularities of text, including phrases, words or even paragraphs. The next step in the synthesis phase 48 (FIG. 3) is to parse the input text and generate a tonal marking prediction for the input sentence (step 34 in FIG. 2). In general, the same natural language processing discussed above is applied to determine parts of speech, grammatical structure, pronunciation of words and identification of the type of sentence for the input text sentence. This process is designated as text analysis box 56 in FIG. 3. The tonal markings are predicted using the information derived from the natural language processing parse using the techniques of Goldsmith discussed above. This aspect of the exemplary embodiment is performed in the prosody generation stage 66 of the synthesis phase 48.

Figure 3:
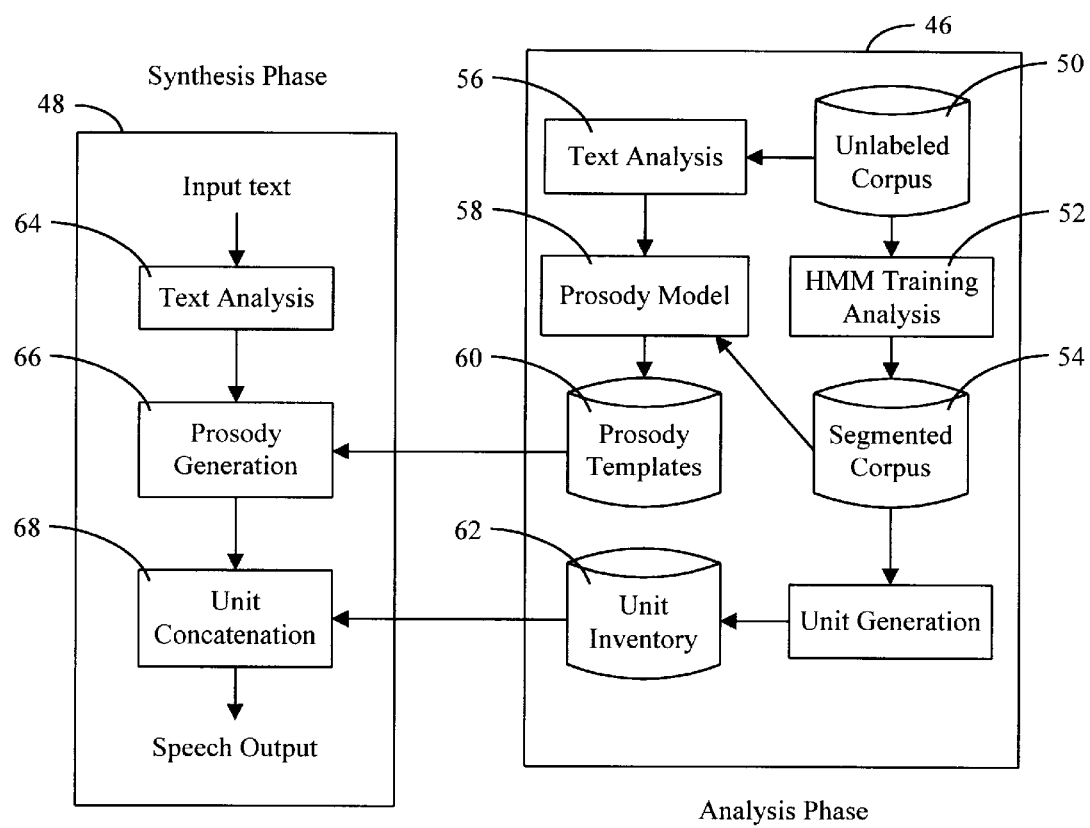
FIG. 3 is a block diagram illustrating the components of the text-to-speech (TTS) facility of the exemplary embodiment of the present invention.

Given the predicted tonal markings, the prosodic template 60 in the prosodic database may be accessed using the predicted tonal markings as an index (step 36 in FIG. 2). It is first determined if there is an exact match (i e., an entry that is indexed by the same tonal marking pattern as that that is predicted for the input sentence) (step 38 in FIG. 2). If there is a matching entry, the weighted fundamental frequencies stored within the entry are used to establish the prosody for the synthesized speech for the input sentence. The system then proceeds to generate speech output (step 44 in FIG. 2) that utilizes these weighted fundamental frequencies. As is shown in FIG. 3, the exemplary embodiment of the present invention uses a concatenative approach to speech synthesis. Specifically, the segmented corpus 55 is processed to identify acoustical units, such as diphones, triphones, etc., that will be used to generate synthesized speech. This process is depicted by unit generation stage 46 in FIG. 3 and yields a unit inventory 62. An appropriate set of units for the input text sentence are extracted from the unit inventory 62 and concatenated to produce the synthesized speech output. The fundamental frequencies from the prosodic database are employed to establish a prosody of the synthesized speech output.

If an exact match is not found in step 38 of FIG. 2, the best-matching entry in the prosodic database is determined, the fundamental frequency values within the best-matching entry are modified to more closely match the modified fundamental frequencies are used in the generation of the synthesized speech output (see steps 42 and 44 in FIG. 2).

The exemplary embodiment of the present invention uses an optimized search strategy to locate the best-matching entry. In particular, the predicted tonal markings are compared with the tonal marking indices for the entries in the prosodic database and the tonal marking indices are scored based upon their similarity to the predicted tonal markings.

Figure 6:
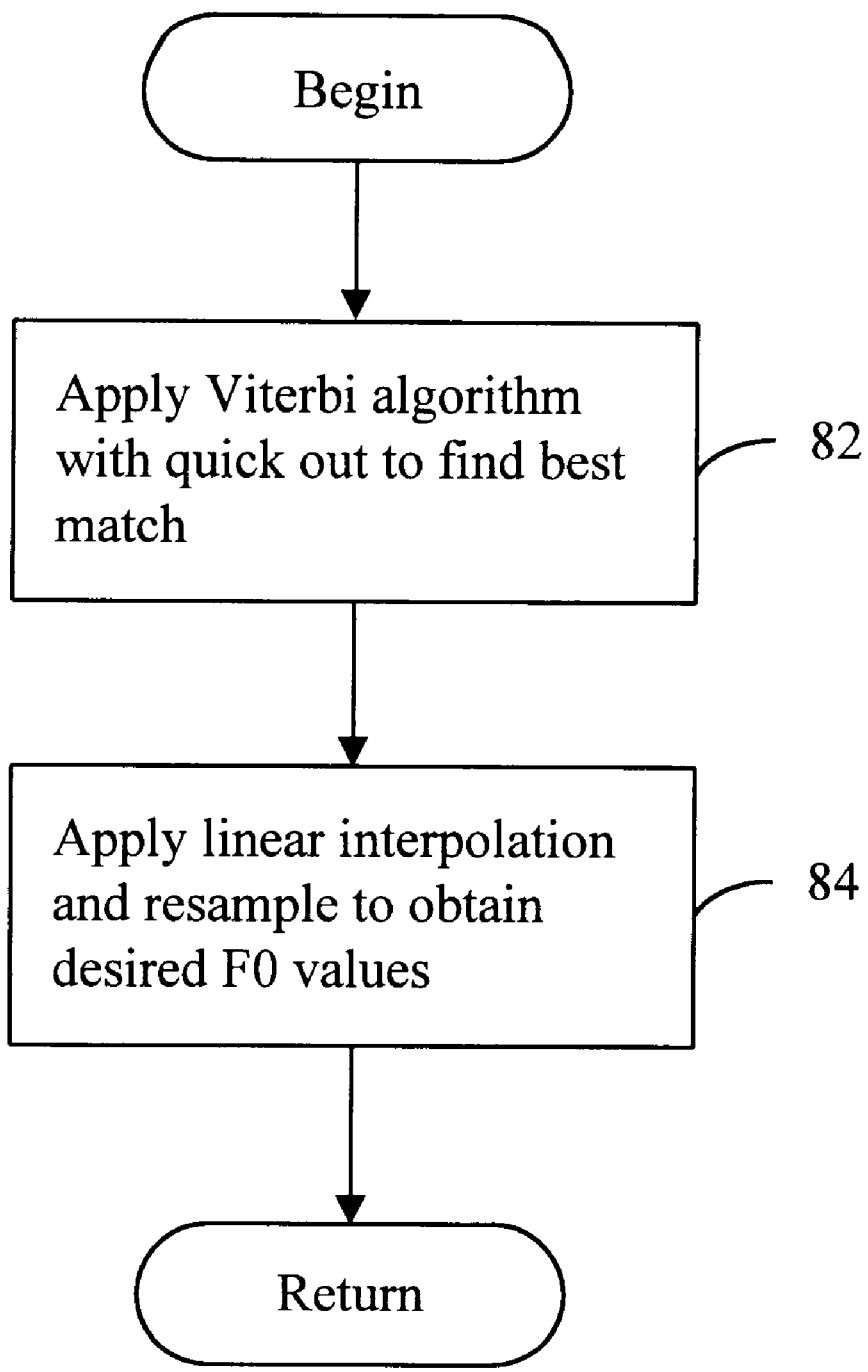
FIG. 6 is a flowchart illustrating the steps that are performed to obtain fundamental frequency values when an exact match is not found in the prosodic database.

Specifically, a dynamic programming (i.e., Viterbi) search is performed on the predicted tonal markings versus the index tonal markings (step 82 in FIG. 6). In order to elaborate on the Viterbi algorithm it is necessary first to establish some nomenclature. The Viterbi algorithm seeks to find a best state sequence for a given observation sequence. The state sequence is designated as q where q equals $(q_1 q_2 \ldots q_T)$, for the given observation sequence $O=(o_1 o_2 \ldots o_T)$, $\lambda$ is a parameter set, and where T is the number of states and observations in the respective sequences. The best score along a single path at time T, which accounts for the first t observation and ends in state i is defined as follows:

$$\delta_t(i) = \max_{q_1, q_2, \ldots, q_{t-1}} P[q_1 q_2 \ldots q_{t-1}, q_t = i, o_1 o_2 \ldots o_t | \lambda]$$

In the present context, each tonal marker represents a state and each value of a tonal marker represents an observation. The Viterbi algorithm may be formally specified as:
1. Initialization $$\delta_1(i) = \pi_1 b_1(o_1), \quad 1 \le i \le N$$

$$\phi_1(i) = 0.$$

where N=number of states; and $\pi_i = P[q_1 = i]$;

2. Recursion $$\delta_t(j) = \max_{1 \le i \le N} [\delta_{t-1}(i) a_{ij}] b_j(o_t), \quad \begin{array}{l} 2 \le t \le T \\ 1 \le j \le N \end{array}$$

where $a_{ij}$=state transition probability from state i to state j; and
$b_j(o_t)$=observation probability for state j that $o_t$ is observed.

$$\phi_t(j) = \arg\max_{1 \le i \le N} [\delta_{t-1}(i) a_{ij}], \quad \begin{array}{l} 2 \le t \le T \\ 1 \le j \le N \end{array}$$

3. Termination $$P^* = \max_{1 \le i \le N} [\delta_T(i)]$$

$$q_T^* = \arg\max_{1 \le i \le N} [\delta_T(i)].$$

4. Path (state sequence) backtracking $$q_t^* = \phi_{t+1}(q_{t+1}^*), \quad t = T-1, T-2, \ldots, 1.$$

Thus, as depicted in FIG. 6, the Viterbi algorithm is applied to find the best match (step 82). The algorithm is modified to provide a quick out. In particular, the system keeps track of the lowest cost solution found so far and aborts the algorithm for each successive string immediately as soon as it is discovered that the minimal cost of modifying the string exceeds the cost of the previously best found string. The costs may be assigned in a number of empirically derived ways. One solution is to assign a cost of the difference between two numerals where a numeral in the predicted tonal pattern string matches the numeral in the index tonal pattern string. Thus, if the predicted tonal pattern string has a value of 2 stored in a position and the like position value stored in the index tonal pattern string is a 3, a cost of 1 would be assigned for this mismatch. A mismatch of characters for the inclusion or deletion of a nonstressed character is assigned a cost of 10.

This quick out approach substantially prunes the search space so that index tonal patterns that are clearly not the best match are ignored as quickly as possible. Hence, the computational overhead is decreased.

The system then seeks to modify the best-matching string of fundamental frequencies so as to obtain a more closely matching sequence. In particular, the fundamental frequencies are modified so as to account for differences between the best-matching index and the predicted tonal pattern with respect to places where the two strings differ in number of unmarked syllables that appear consecutively. The portion of the best-matching string of fundamental frequencies that differs is then modified by linearly interpolating between the original fundamental frequency values in the region in order to form a continuous function. The range is then divided up into the required new number of regions and resampled at these points in order to form a new set of discrete points representing the desired output fundamental frequency sample points for the region. Consider the example where the best-matching index has a tonal marking pattern of "H 5 H". This pattern specifies that the first syllable has a high tone marking followed by five unmarked syllables which, in turn, is followed by a high tone mark syllable. Suppose that the predicted tone pattern is "H 4 H". The best-matching index has an additional unmarked syllable. It must be modified in order to produce four unmarked syllables. The seven fundamental frequency values of the best-matching prosodic database entry are processed to linearly interpolate between the seven points to create a continuous function composed of six linear segments. The six linear segments are resampled at four new intermediate unmarked points, and the two previous fundamental frequency values corresponding to the high tone marked end points are kept. As a result, a matching pattern of fundamental frequencies is produced.

One of the primary benefits of the exemplary embodiment of the present invention is that it allows a selection of the style of speech that one wishes to have synthesized. The multiple voice fonts provide the ability to quickly and easily generate various individualistic personic styles for a given speaker. The speech that is generated need not be all of one prosodic style and derive from a single speaker.

While the present invention has been described with reference to an exemplary embodiment thereof, those skilled in the art will appreciate that various changes in form and detail may be made without departing from the intended scope of the present invention as defined in the appended claims. For example, the present invention may be practiced with systems that parse phrases rather than sentences and may use alternative units of speech, such as phonemes. Moreover, other segmentation techniques may be used.

We claim:

1. In a system for synthesizing speech, a method comprising the computer-implemented steps of:
   providing text for which speech is to be synthesized;
   providing prosodic templates created from a corpus of words spoken in a prosodic manner where each template holds a sequence of fundamental frequency values for units of speech;
   selecting one of the templates for use in establishing prosody for the synthesized speech for the text; and synthesizing speech for the text using at least one of the fundamental frequencies from the selected template in establishing prosody for the speech.

2. The method of claim 1, further comprising the step of segmenting text into units of speech to establish segmentation for the text.

3. The method of claim 1 wherein the units of speech are syllables.

4. The method of claim 1 wherein the text is a phrase.

5. The method of claim 1 wherein the text is a sentence.

6. The method of claim 1 wherein each prosodic template is indexed by a tonal emphasis marker pattern wherein a tonal marker is provided for each unit of speech in the text.

7. The method of claim 6, further comprising the step of generating a predicted tonal marker pattern for the text, wherein the selecting of one of the templates is performed by selecting a template with an index that best matches the predicted tonal marker pattern.

8. In a system for synthesizing speech, a computer-readable storage medium holding instructions for performing a method comprising the computer-implemented steps of:

providing text for which speech is to be synthesized;

providing prosodic templates created from a corpus of words spoken in a prosodic manner where each template holds a sequence of fundamental frequency values for units of speech;

selecting one of the templates for use in establishing prosody for the synthesized speech for the text; and synthesizing speech for the text using at least one of the fundamental frequencies from the selected template in establishing prosody for the speech.

9. The computer-readable storage medium of claim 8 wherein the storage medium also holds instructions for segmenting the text into units of speech.

10. The computer-readable storage medium of claim 9 wherein the units of speech are syllables.

11. The computer-readable storage medium of claim 8 wherein each prosodic template is indexed by a tonal emphasis marker pattern wherein a tonal marker is provided for each unit of speech in the text.

12. The computer-readable storage medium of claim 9 wherein the method further comprises the step of:

generating a predicted tonal marker pattern for the text; and wherein the selecting of one of the templates is performed by selecting a template with an index that best matches the predicted tonal marker pattern.

13. In a system for synthesizing speech, a method comprising the computer-implemented steps of:

providing a prosodic database of fundamental frequencies for units of speech, each entry in said prosodic database being indexed by a pattern of tonal markings that correspond with a degree of emphasis for the units of speech for which fundamental frequencies are held;

performing a natural language parse on a given text;

based on results of the natural language parse, predicting a predicted pattern of tonal markings for the units of speech in the text;

identifying a best-matching index in the prosodic database by comparing the predicted pattern of tonal markings for the units of speech in the text with the indices of the entries of the prosodic database; and using at least one of the fundamental frequency values in the entry in the prosodic database that is indexed by the best-matching index to establish prosody in synthesizing speech for the text.

14. The method of claim 13 wherein the best-matching index exactly matches the predicted pattern of tonal markings.

15. The method of claim 13 wherein all of the fundamental frequency values in the entry that is indexed by the best-matching index are used in establishing prosody.

16. The method of claim 13 wherein the best-matching index does not exactly match the predicted pattern of tonal markings.

17. The method of claim 13 wherein the tonal markings include a high emphasis tonal marker, a low emphasis tonal marker, a no special emphasis tonal marker and a marker that specifies unmarked stress.

18. The method of claim 17 wherein the best-matching index differs from the predicted pattern of tonal markings in number of consecutive unmarked stress for the units of speech.

19. The method of claim 18, further comprising the steps of:

identifying a non-matching portion of the best-matching index that does not match the predicted pattern of tonal markings and the fundamental frequency values, in the entry in the prosodic database that is indexed by the best-matching index that corresponds to the non-matching portion of the best-matching index;

applying linear interpolation between the bounding fundamental frequency values in the prosodic database entry indexed by the best-matching index that bound the identified fundamental frequency values in the entry that corresponds to the non-matching portion of the best-matching index to create a continuous function between the bounding fundamental frequency values;

resampling the continuous function to obtain a number of fundamental frequency values for unmarked stress units of speech that matches the number of consecutive unmarked stress markers in the predicted pattern of tonal markings; and using the fundamental frequency values obtained by resampling in establishing prosody in synthesizing speech for the text.

20. The method of claim 13 wherein a Viterbi search is employed to identify the best-matching index.

21. In a system for synthesizing speech, a computer-readable storage medium holding instructions for performing a method comprising the computer-implemented steps of:

providing a prosodic database at fundamental frequencies for units of speech, each entry in said prosodic database being indexed by a pattern of tonal markings that correspond with a degree of emphasis for the units of speech for which fundamental frequencies are held;

performing a natural language parse on a given text;

based on results of the natural language parse, predicting a predicted pattern of tonal markings for the units of speech in the text;

identifying a best-matching index in the prosodic database by comparing the predicted pattern of tonal markings for the units of speech in the text with the indices of the entries of the prosodic database; and using at least one of the fundamental frequency values in the entry in the prosodic database that is indexed by the best-matching index to establish prosody in synthesizing speech for the text.

22. The computer-readable storage medium of claim 21 wherein the best-matching index exactly matches the predicted pattern of tonal markings.

23. The computer-readable storage medium of claim 21 wherein all of the fundamental frequency values in the entry that is indexed by the best-matching index are used in establishing prosody.

24. The computer-readable storage medium of claim 21 wherein the best-matching index does not exactly match the predicted pattern of tonal markings.

25. The computer-readable storage medium of claim 21 wherein the tonal markings include a high emphasis tonal marker, a low emphasis tonal marker, a no special emphasis tonal marker and a marker that specifies unmarked stress.

26. The computer-readable storage medium of claim 25 wherein the best-matching index differs from the predicted pattern of tonal markings in number of consecutive unmarked stress for the units of speech.

27. The computer-readable storage medium of claim 26 wherein the medium also holds instructions for:
    identifying a non-matching portion of the best-matching index that does not match the predicted pattern of tonal markings and the fundamental frequency values, in the entry in the prosodic database that is indexed by the best-matching index that corresponds to the non-matching portion of the best-matching index;
    applying linear interpolation between the bounding fundamental frequency values in the prosodic database entry indexed by the best-matching index that bound the identified fundamental frequency values in the entry that corresponds to the non-matching portion of the best-matching index to create a continuous function between the bounding fundamental frequency values;
    resampling the continuous function to obtain a number of fundamental frequency values for unmarked stress units of speech that matches the number of consecutive unmarked stress markers in the predicted pattern of tonal markings; and
    using the fundamental frequency values obtained by resampling in establishing prosody in synthesizing speech for the text.

28. The computer-readable storage medium of claim 21 wherein a Viterbi search is employed to identify the best-matching index.

29. In a computer system, a method of building a prosodic database, comprising the computer-implemented steps of:
    obtaining an acoustical signal for each of multiple corresponding portions of spoken text that are spoken by a human trainer, each said acoustical signal being the signal that results when the human trainer speaks the corresponding portion of text;
    obtaining a laryngograph signal for each portion of spoken text from a laryngograph worn by the human trainer when the portions of text are spoken;
    segmenting the acoustical signal into segments representing syllables in the text where each syllable includes a vowel section;
    segmenting the laryngograph signal into segments that match the segments of the acoustical signal;
    calculating a weighted sum of instantaneous fundamental frequencies for the vowel section of each syllable in each portion of text wherein the fundamental frequencies are obtained from the laryngograph signal and weights are obtained from the acoustical signal;
    for each portion of text, storing the weighted sum of instantaneous fundamental frequencies for each syllable of the portion of text in the prosodic database; and
    using the weighted sums of instantaneous fundamental frequencies in the prosodic database to establish prosody of synthesized speech.

30. The method of claim 29 wherein, for each vowel section of a syllable, the laryngograph signal includes peaks and wherein each instantaneous fundamental frequency is calculated to be 1 divided by a quantity of time that separates immediately adjacent peaks.

31. The method of claim 30 wherein each instantaneous fundamental frequency is weighted based on magnitude of the acoustical signal during a portion of the acoustical signal that corresponds with the immediately adjacent peaks in the laryngograph signal.

32. In a computer system, a computer-readable storage medium holding instructions for performing a method of building a prosodic database comprising the steps of:
    obtaining an acoustical signal for each of multiple corresponding portions of spoken text that are spoken by a human trainer, each said acoustical signal being the signal that results when the human trainer speaks the corresponding portion of text;
    obtaining a laryngograph signal for each portion of spoken text from a laryngograph worn by the human trainer when the portions of text are spoken;
    segmenting the acoustical signal into segments representing syllables in the text where each syllable includes a vowel section;
    segmenting the laryngograph signal into segments that match the segments of the acoustical signal;
    calculating a weighted sum of instantaneous fundamental frequencies for the vowel section of each syllable in each portion of text wherein the fundamental frequencies are obtained from the laryngograph signal and weights are obtained from the acoustical signal;
    for each portion of text, storing the weighted sum of instantaneous fundamental frequencies for each syllable of the portion of text in the prosodic database; and
    using the weighted sums of instantaneous fundamental frequencies in the prosodic database to establish prosody of synthesized speech.

33. A text to speech system, comprising:
    a parser for parsing input text into units of speech;
    a prosodic database holding prosodic templates created from a corpus of words spoken in a prosodic manner wherein each prosodic template holds a sequence of fundamental frequency values for units of speech; and
    a speech synthesizer for generating speech corresponding to the input text by using a selected one of the templates in the prosodic database to obtain fundamental frequency values for units of speech in the input text.

34. The text to speech system of claim 33 wherein the system further comprises a tonal pattern predictor for predicting the tonal pattern for the input text and wherein the speech synthesizer uses the predicted tonal pattern for the input text to select the selected template in the prosodic database.

35. In a system for generating speech, a method comprising the computer-implemented steps of:
    providing a prosodic database holding prosodic templates for different styles of speech, each prosodic template comprising a sequence of fundamental frequencies associated with using the template's respective style of speech while speaking a sequence of language units;
    determining what prosodic style to apply to a portion of speech to be generated; and
    using at least one of the templates in the prosodic database for the determined prosodic style to generate the portion of speech with the determined prosodic style.

36. In a system for generating speech, a computer-readable medium holding computer-executable instructions for performing a method comprising the computer-implemented steps of:

providing a prosodic database holding prosodic templates for different styles of speech, each prosodic template comprising a sequence of fundamental frequencies associated with using the template's respective style of speech while speaking a sequence of language units;

determining what prosodic style to apply to a portion of speech to be generated; and using at least one of the templates in the prosodic database for the determined prosodic style to generate the portion of speech with the determined prosodic style.

37. In a system for generating speech, a method comprising the computer-implemented steps of:

providing a prosodic database holding prosodic templates of different prosodic styles for a single speaker, each prosodic template comprising a series of fundamental frequencies associated with the single speaker using the template's associated prosodic style while speaking a sequence of language units;

determining which of the prosodic styles is to be applied to a portion of speech that is to be generated; and using at least one of the templates in the prosodic database for the determined prosodic style to generate the portion of speech with the determined prosodic style.

38. In a system for generating speech, a computer-readable medium holding computer-executable instructions for performing a method comprising the computer-implemented steps of:

providing a prosodic database holding prosodic templates of different prosodic styles for a single speaker, each prosodic template comprising a series of fundamental frequencies associated with the single speaker using the template's associated prosodic style while speaking a sequence of language units;

determining which of the prosodic styles is to be applied to a portion of speech that is to be generated; and using at least one of the templates in the prosodic database for the determined prosodic style to generate the portion of speech with the determined prosodic style.

\* \* \* \* \*